United States Patent [19]

Hagiuda

[11] Patent Number: 5,040,007
[45] Date of Patent: Aug. 13, 1991

[54] ELECTRONIC FLASHLIGHT APPARATUS

[75] Inventor: Nobuyoshi Hagiuda, Kawasaki, Japan

[73] Assignee: Nikon Corporation, Tokyo, Japan

[21] Appl. No.: 477,354

[22] Filed: Feb. 7, 1990

[30] Foreign Application Priority Data

Feb. 7, 1989 [JP] Japan .................................. 1-29003

[51] Int. Cl.$^5$ .................................................. G03B 15/05
[52] U.S. Cl. .............................. 354/145.1; 354/149.1
[58] Field of Search ................. 354/149.1, 145.1, 126, 354/141, 149.11; 362/18, 16, 17, 7, 3

[56] References Cited

U.S. PATENT DOCUMENTS

| 4,462,666 | 7/1984 | Orban | 354/126 |
| 4,847,647 | 7/1989 | Ueda | 354/149.1 |
| 4,920,368 | 4/1990 | Arai et al. | 354/149.11 X |

Primary Examiner—L. T. Hix
Assistant Examiner—Jae N. Noh
Attorney, Agent, or Firm—Michael N. Meller

[57] ABSTRACT

Disclosed is an electronic flashlight apparatus attachable to camera and having a flashlight illuminating direction variable under electrical control. The flashlight apparatus includes a flashlight projection unit including a flashlight source and a reflecting optical system adapted for reflecting a portion of a flashlight from the source, a direction converting unit supporting the projection unit and adapted for changing the projection position of the projection unit between a normal position of projecting the flashlight from the source towards an object and a special projection position of projecting the flashlight in a direction different from the projection direction by the normal position, a driving unit for driving the direction converting unit, a control unit for electrically controlling the driving unit, and a housing of the flashlight apparatus accommodating at least the projection unit and the direction converting unit.

10 Claims, 7 Drawing Sheets

ELECTRONIC FLASHLIGHT APPARATUS

BACKGROUND OF THE INVENTION

1. Field of the Invention

This invention relates to an electronic flashlight apparatus and, more particularly, to an electronic flashlight apparatus having a variable flashlight illuminating direction.

2. Description of the Prior Art

Up to the present, an electronic flashlight apparatus having a variable elevation angle of a light emission unit and a variable illuminating direction has been known from, for example, the JP Utility Model Laid-open Publication No. 55(1980)-42835.

When electronic flashlight apparatus having a variable illuminating direction is mounted on and used with a camera, a light emission unit may be set to an upwardly directing position (bounce lighting position) and the illuminating light emitted during shooting towards the ceiling or wall to illuminate an object indirectly by the reflected light is by way of a so-called bounce lighting. If the distance to an object is as short as, for example, 1 meter, the light emission unit may be slightly tilted towards the imaging lens to prevent uneven illumination produced due to insufficient illumination at both lower corners of the object which is brought about as a result of deviations between the optical axis of the imaging lens and that of the light emission unit. This position is referred to hereinafter as the near-distance shooting position.

However, the above-mentioned conventional electronic flashlight apparatus is comprised of a housing of the flashlight apparatus mounted on a camera body, and a separate light emission unit mounted on the housing for rotation in the elevating direction, so that the apparatus as a whole is increased in size, while water drops tend to intrude into the interior of the housing of the flashlight apparatus by way of interstices of the rotational section. In addition, the apparatus is poor in operability because the rotating operation for the light emission unit is performed manually.

SUMMARY OF THE INVENTION

It is therefore an object of the present invention to eliminate the above-mentioned inconveniences of the prior-art apparatus and to provide a small-sized and highly reliable electronic flashlight apparatus in which the light emission unit is accommodated and protected within the housing of the flashlight apparatus and in which the position of the light emission unit may be easily controlled from outside.

In one aspect, the present invention resides in an electronic flashlight apparatus comprising flashlight projection means including a flashlight source and a reflecting optical system adapted for reflecting a portion of an illuminating light from said flashlight source, projecting direction converting means supporting said flashlight projection means and adapted for changing the projection position of said flashlight projection means between a normal projection position of projecting the illuminating light from said flashlight source towards an object and a special projection position of projecting the illuminating light in a predetermined direction different from the projection direction when in said normal projection position, driving means for driving said projection direction converting means, control means for electrically controlling said driving means, and a housing of the flashlight apparatus accommodating at least said flashlight projection means and said projection direction converting means.

With the electronic flashlight apparatus of the present invention, since flashlight projection means and projection direction converting means are protected in a housing of the flashlight apparatus, the apparatus is small in size and not susceptible to malfunctions due to water drops or dust and dirt. The projection direction converting means is responsive to the operation of driving means electrically controlled by control means to change the position of the flashlight projection means to facilitate position control of flashlight projection means.

The above and other objects, features and advantages of the present invention will become apparent from the following description of preferred embodiments of the present invention, especially when read in conjunction with the accompanying drawings.

DESCRIPTION OF THE PREFERRED EMBODIMENTS

By referring to the accompanying drawings, certain preferred embodiments of the present invention are explained in detail.

Figure 1:
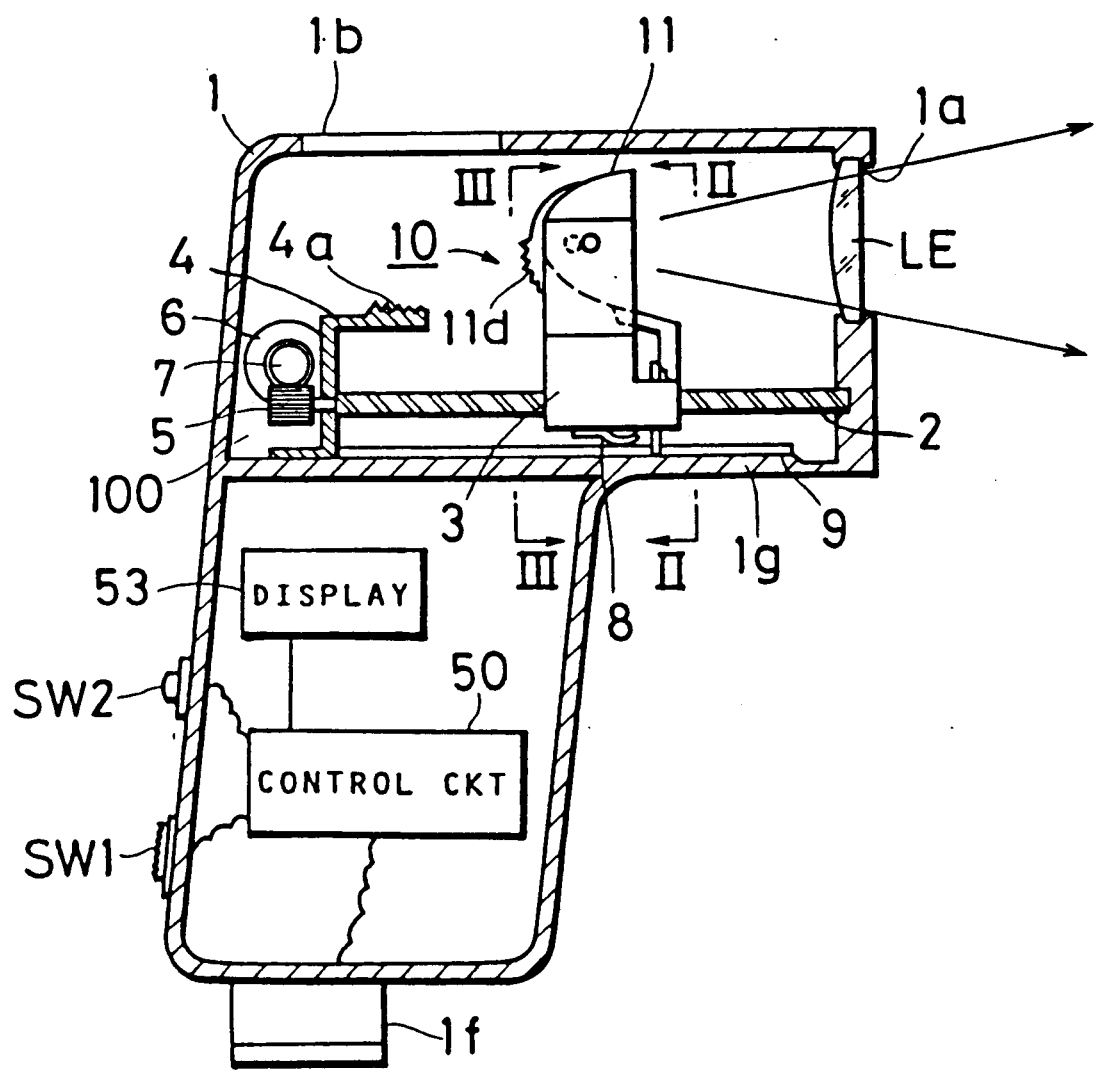
FIG. 1 is a sectional cross-sectional view showing a general construction of a first embodiment of the present invention.

Referring to FIG. 1, numeral 1 denotes a housing of a flashlight apparatus including a pair of shield windows 1a, 1b and an attachment section 1f which is adapted to be usually attached to an accessory shoe, not shown, provided on an upper part of a camera body above an imaging lens, also not shown. The first shield window 1a and the second shield window 1b are formed in the front wall and the upper wall of the housing 1, respectively. A convex or Fresnel lens LE and a transparent plastic plate are fitted in the first shield window 1a and in the second shield window 1b, respectively.

Figure 2:
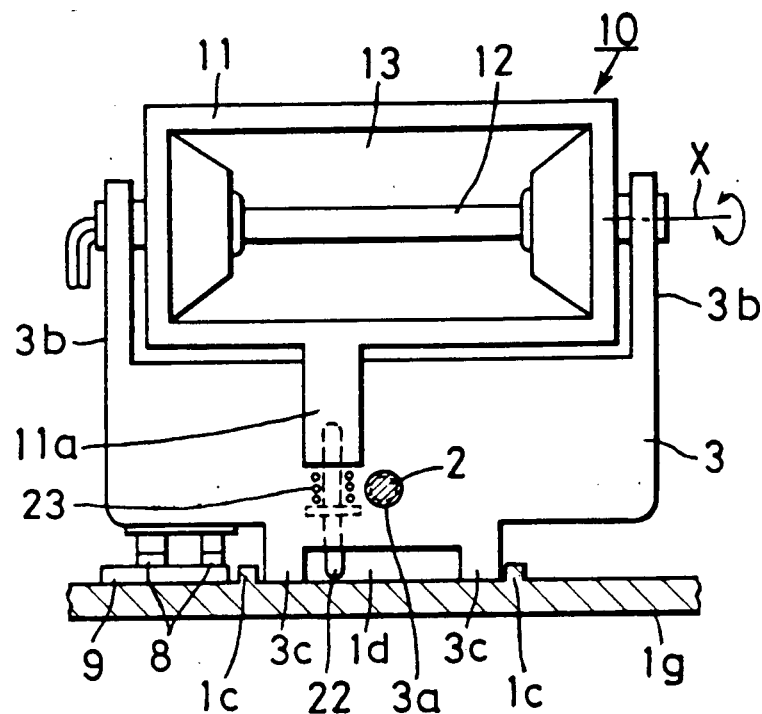
FIG. 2 is a cross-sectional view taken along line II—II of FIG. 1.
Figure 3:
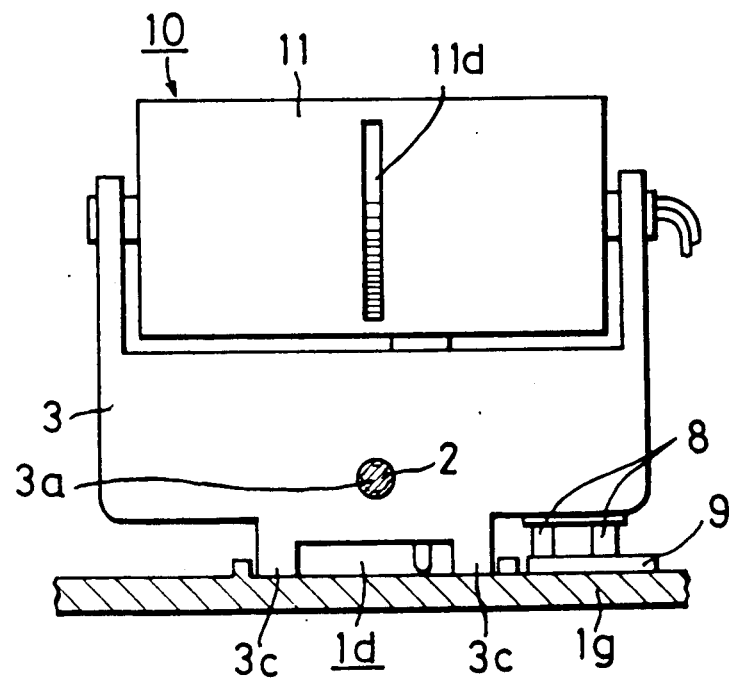
FIG. 3 is a cross-sectional view taken along line III—III of FIG. 1.

A feed screw 2 has its one end rotatably fulcrumed by the front wall of the housing 1, and is threadedly passed through a threaded hole 3a in a base block 3, as shown in FIG. 2, so as to be fulcrumed by a bearing 4 at the rear end of the housing 1, as shown in FIG. 1. A gear 5 is mounted at the rear end of the feed screw 2 and meshes with a worm gear 7 mounted on an output shaft of an electric motor 6. Thus the feed screw 2 is rotated by the driving power of the electric motor 6.

As shown in FIG. 2, a pair of slide legs 3c are formed at the lower part of the base block 3. On the other hand, the upper surface of a partition wall 1g vertically dividing the housing 1 is formed with a guide groove 1d by a pair of projections 1c, with the slide legs 3c being slidably accommodated inside the guide groove 1d. Thus the base block 3 is adapted to be guided by rotation of the feed screw 2 within the guide groove 1d so as to be moved between the foremost position shown in FIG. 5 and the rearmost position shown in FIG. 6.

A light emission unit 10 is supported by a pair of supporting arms 3b at both ends of the base block 3 for rotation about an axis X in FIG. 2. The light emission unit 10 is comprised of a light emission tube 12 and a reflecting cup 13 in the form of a concave mirror in the inside of a frame 11, and is usually placed in a normal position or first position in which, as shown in FIG. 4, the reflecting surface of the reflecting cup 13 and the emission tube 12 face toward the first shield window 1a and the optical axes of the light emission unit 10 and of the imaging lens of the camera are substantially parallel to each other.

The light emission unit 10 is also movable within a range A, shown in FIG. 4, which is delimited between the forward end of a rack gear 4a as later described and the rear end of a groove 1e. By this movement, the distance between the unit 10 and the first shield window 1a is changed and, responsive thereto, the field angle of illumination of the light emitted from the emission unit 10 by way of the first shield window 1a is changed. The light emitted by the tube 12 is radiated forwards either directly or after reflection by the reflecting cup 13. The light emitted by the unit 10 thus includes both the directly emitted light and the reflected light.

Figure 4:
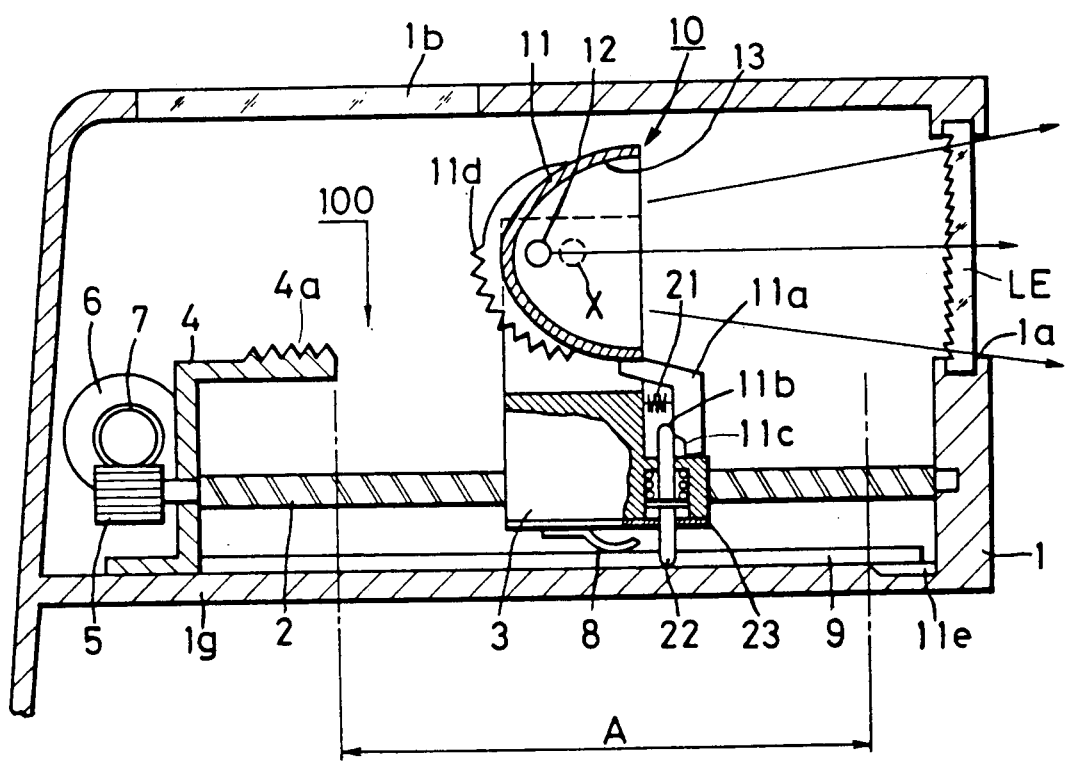
FIG. 4 is a cross-sectional view showing a light emission unit shifting device with the light emission unit at the normal position.

Referring to FIG. 4, a projecting arm is formed at the lower part of the frame 11 holding the light emission tube 12 and the reflecting cup 13. A slide pin 22 is retained for vertical movement at the front side of the base block 3 and biased downwards by a compression coil spring 23 with its lower end abutting on the upper surface of the partition wall 1g. The light emission unit 10 is perpetually biased clockwise in FIG. 4 about the axis X as the center of rotation, under the force of a tension coil spring 21 interposed between the arm 11a and the front side of the base block 3. The light emission unit 10 is usually maintained in the above-mentioned normal position, in which the axis of the emitted light runs parallel to the optical axis of the imaging lens, by engagement of the upper end of the slide pin 22 with the surface 11b of the projecting arm 11a.

Figure 5:
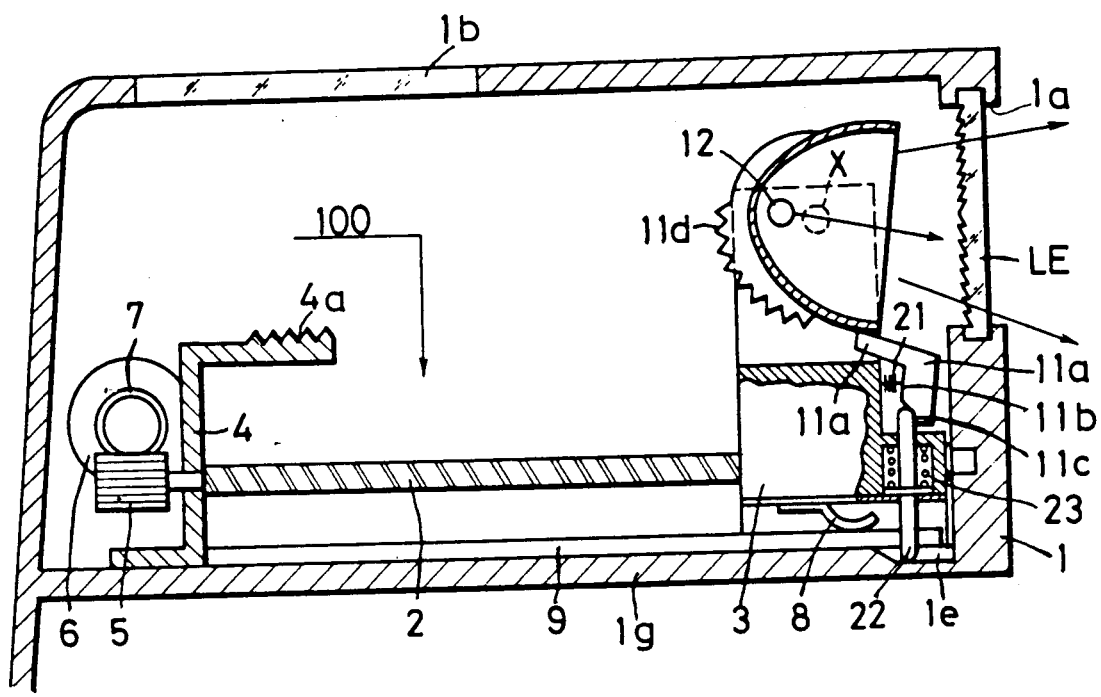
FIG. 5 is a cross-sectional view showing a light emission unit shifting device with the light emission unit having been shifted to the foremost position.

The groove 1e is formed at the front upper surface of the partition plate 1g of the housing 1. When the base block 3 reaches the foremost position, as shown in FIG. 5, the lower end of the slide pin 22 falls into the groove 1e, so that the upper end of the slide pin 22 engages a lower end recess 11c of the projecting arm 11a, as a result of which the light emission unit 10 is rotated slightly clockwise to assume a near-distance shooting position or second position shown in FIG. 5. At this time, the light emission unit 10 is in the state of emitting the light in a direction tilted a predetermined angle from the above-mentioned normal position towards the imaging lens.

A segmental gear 11d is formed on the back side of the frame 11 of the light emission unit 10 and adapted to mesh with the rack gear 4a formed as one with the bearing 4 when the base block 3 reaches the predetermined rear position. With the segmental gear 11d meshing with the rack gear 4a, the light emission unit 10 is turned counterclockwise about the axis X as the center of rotation, while being moved rearwards, until the unit 10 assumes a bounce position or third position shown in FIG. 6. At the rearmost position, shown in FIG. 6, the optical axis of the light emitted from the light emission unit 10 makes an angle of substantially 90° with the optical axis of the imaging lens, the emission tube 12 then facing the second shield window 1b. The feed screw 2, electric motor 6, rack gear 4a, segmental gear 11d, projecting arm 11a and the slide pin 22 make up a driving unit 100.

A pair of contact brushes 8 are projectedly mounted on the lower surface of the base block so as to be contact with a pattern of a printed circuit board 9 provided on the upper surface of the partition plate 1g. On the basis of the contact between the contact brushes 8 and the pattern of the printed circuit board 9, the location of the base block 3 and hence that of the light emission unit 10 is detected by a position detection circuit 52 as later described (FIG. 7).

Figure 7:
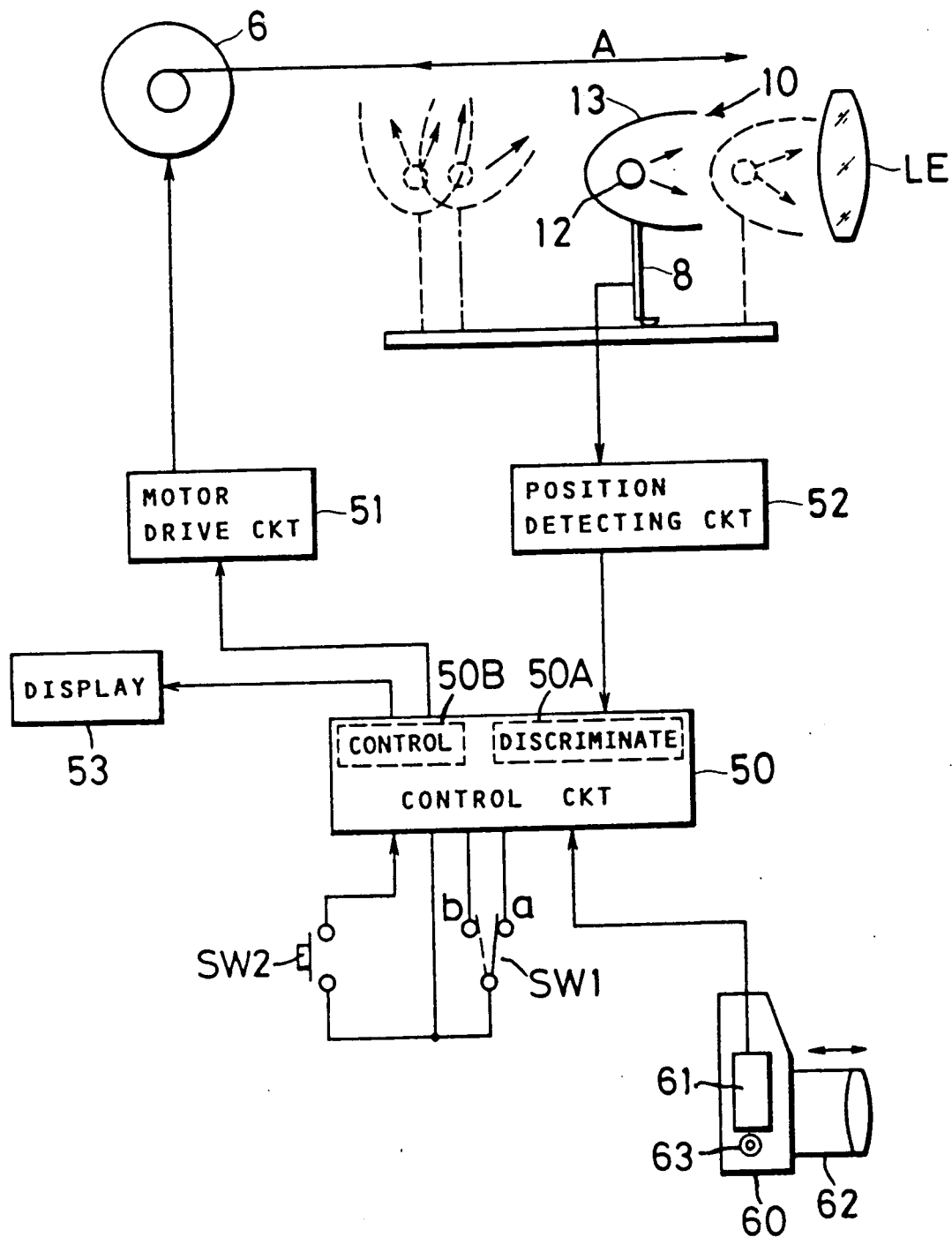
FIG. 7 is a block diagram for illustrating the control system according to the first embodiment.

Referring to FIG. 7, which is a block diagram showing a control system, a motor driving circuit 51 for the electric motor 6, a position detection circuit 52 for the emission unit 10, a display circuit 53 and switches SW1, SW2, as described subsequently, are connected to a control circuit 50 including a decision unit 50A and a control unit 50B. The position detection circuit 52 detects, from the contact between the contact brushes 8 and the printed circuit board 9, the position of the light emission unit 10 in the fore and aft direction of the base block 3 and hence that of the emission unit 10 to supply the detected position data to the control circuit 50.

The arrangement of the control circuit 50 is such that, when the housing 1 is attached to the accessory shoe, not shown, of the camera body 60 by means of the attachment section 1f, the control circuit 50 is electrically connected to a control circuit 61 in the camera. A signal corresponding to the focal length of an imaging lens or zoom lens 62, detected by a focal length detection circuit in the camera, not shown, is input to the control circuit 50 by way of the control circuit 61. When the distance to an object is detected by a distance measurement device, not shown, as a result of half pressing of a release button 63 in the camera, a signal corresponding to the thus-detected distance to the object is similarly input to the control circuit 50 by way of the control circuit 61.

The changeover switch SW1 may be switched by manual operation between a solid line position a and a broken line position b. With the switch SW1 at the solid line position a, the light emission unit 10 can be set to the manual position by the operation of the switch SW2, as will be described subsequently. With the switch SW1 at the broken line position, automatic position control of the emission unit 10 is performed within the control circuit 50 by the input signal from the camera side control circuit 61. The display unit 53 displays, by means of a liquid crystal display device, not shown, the focal length of the zoom lens 62, the posture and the position in the fore and aft direction of the light emission unit 10.

Figure 8:
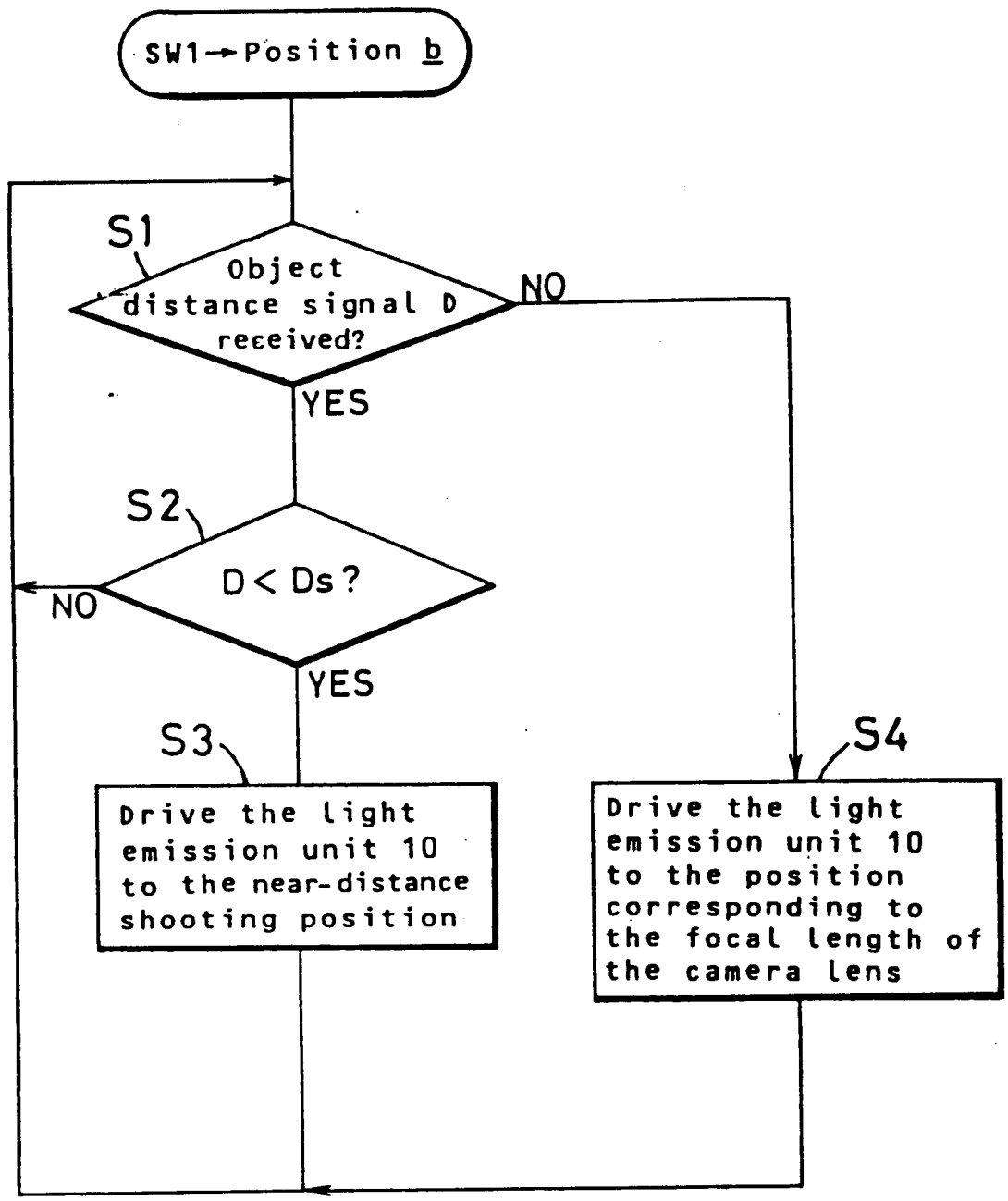
FIG. 8 is a flowchart showing the operational sequence of the control circuit according to the first embodiment.

By referring to the flowchart of FIG. 8, the operation of the above-described embodiment of the present invention is explained.

FIG. 8 is a flowchart showing the control sequence in the control circuit 50, and illustrates the case in which position control of the light emission unit 10 is performed from the camera side signal. With the switch SW1 switched to the broken line position b, the program is started by interruption. Thus, at step S1, it is determined if a signal D indicating the distance to the object has been input from the above-mentioned distance measurement unit. If the half pressing of the camera side release button 6 has not been made, such that the result of decision at step S1 is NO, the unit 10 is driven at step S4 to set the unit 10 at a position corresponding to the focal length of the zoom lens 62.

If, as a result of the changing of the focal length of the zoom lens 62, the signal corresponding to the focal length is input from the camera side control circuit 61, the control circuit 50 drives the motor 6 by means of the motor driving circuit 51 shown in FIG. 7 to rotate the feed screw 2 a predetermined amount in a predetermined direction. By such rotation of the feed screw 2, the base block 3 is moved in the fore and aft direction within the range of the region A shown in FIG. 4 to change the distance between the emission unit 10 and the Fresnel lens LE, as a result of which the field angle of illumination of the illuminating light of the emission unit 10 is changed so as to be substantially coincident with the field angle of coverage consistent with the focal distance of the zoom lens 62.

If the result of the decision at step S1 is, YES, that is if half pressing of the release button 63 has been made and, concomitantly therewith, the distance to the object detected by the measurement device of the camera body 60 has been input to the control circuit 50, it is determined at step S2 by decision unit 50A if the input distance to the object is less than a predetermined value Ds. If the result of decision at step S2 is NO, the program reverts to step S1, where it is determined if a new value of the distance to the object has been input. If the result of decision at step S2 is YES, the program proceeds to step S3. In this step S3, the motor 6 is driven by means of the motor drive circuit 51 to rotate the feed screw 2 in a predetermined direction to shift the base block 3 towards the foremost position.

When the lower end of the pin 22 reaches the groove 1e of the housing 1 as a result of such shifting of the base block 3, the lower end of the pin 22 falls into the groove 1e, as shown in FIG. 5, under the bias of the coil spring 23. As a result, the upper end of the pin 22 is disengaged from the lateral side 11b of the arm 11a, so that the emission unit 10 is rotated clockwise, under the bias of the tension coil spring 21, until it is halted, as shown in FIG. 5, with the recess 11c at the lower end of the projecting arm 11a then engaging the upper end of the pin 22.

As described hereinabove, if the distance to the object when the switch SW1 is switched to the broken line position b is larger than a predetermined value, the emission unit 10 is automatically moved, at step S4, with changing of the focal length of the zoom lens 62, to a position consistent with the thus-changed focal length, that is, to a position in which the field angle of illumination of the light emission unit 10 is substantially coincident with the field angle of coverage. At this time, the unit 10 is at the normal position shown in FIG. 4 in which the optical emission axis is substantially parallel to the optical axis of the camera lens. If the distance to the object is less than a predetermined value at step S2, the base block 3 is driven to the foremost position, irrespective of the focal length of the zoom lens 62, such that the emission unit 10 automatically assumes the near-distance shooting position shown in FIG. 5.

When the switch SW1 is switched to the solid line position a in FIG. 7, the control circuit 50 performs, on the basis of the actuation of the switch SW2, the motor driving control for the manual position setting of the light emission unit 10. More specifically, assuming that the lens 62 is a zoom lens having a focal length variable in the range from 28 to 70, the control circuit 50 shifts the unit 10 for each operation of the switch SW2 by the motor 6 by means of the motor driving circuit 51 for positioning the unit 10 at a position corresponding to the focal length of 28 mm, for example, that is, a forward position at which the field angle of coverage for the focal length of 28 mm of the zoom lens 62 is substantially coincident with the field angle of illumination of the emission unit 10. Then, for each actuation of the switch SW2, the emission unit 10 is sequentially shifted to positions which afford several different field angles of illumination, for example, field angles of illumination corresponding to the field angles of coverage for the focal lengths of 35, 50 and 70 mm.

Figure 6:
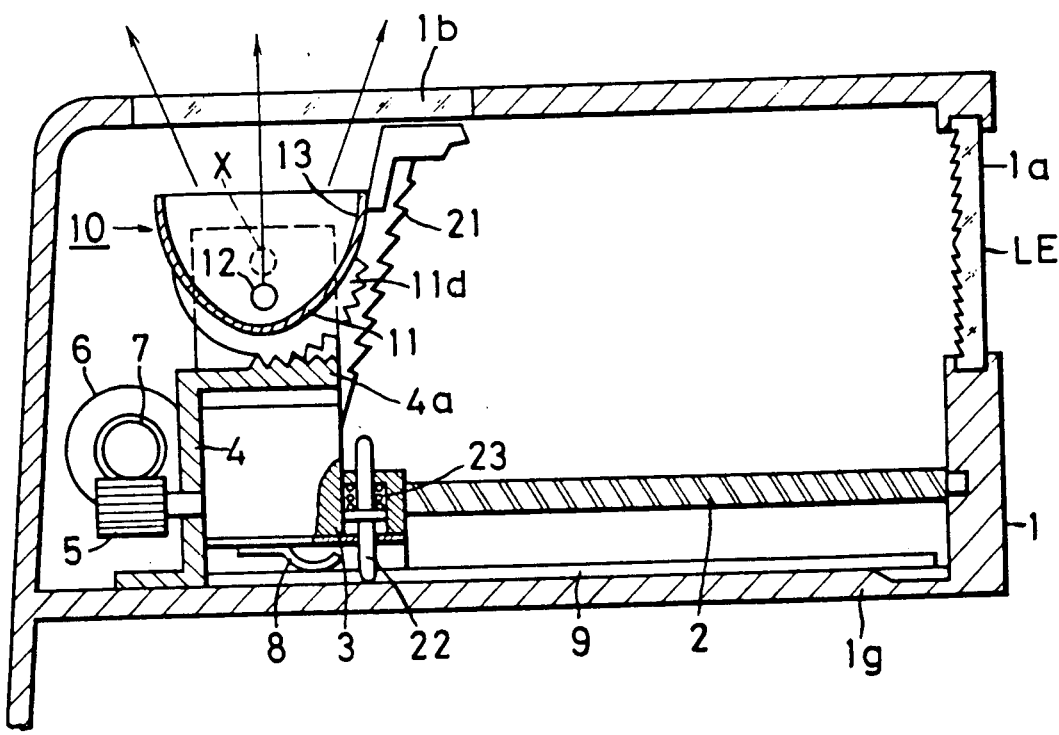
FIG. 6 is a cross-sectional view showing a light emission unit shifting device with the light emission unit having been shifted to the rearmost position.

The bounce lighting control shown in FIG. 6 is hereinafter explained. It is assumed that the above-mentioned zoom lens has been mounted on the camera. Assuming that, in FIG. 7, when the changeover switch SW1 is switched to solid line position a (manual mode), and the switch SW2 is further actuated, with the unit 10 being at the rearmost position in the region A affording the field angle of radiation corresponding to the focal length 70 mm of the imaging lens 62, the control circuit 50 causes the feed screw 2 to rotate a predetermined amount in a predetermined direction to shift the base block 3 and hence the emission unit 10 rearwards. With such rearward shifting of the base block 3 away from the region A, the segmental gear 11d provided on the rear surface of the frame 11 of the light emission unit 10 meshes with the rack gear 4a of the bearing 4. The emission unit 10 then starts to be rotated counterclockwise against the bias of tension coil spring 21 until the rearward movement of the base block 3 is terminated at a position at which the optical exis of the light emitting unit 10 makes an angle of 60° with that of the imaging lens 62. The position thus achieved of the emission unit 10 represents the first bounce lighting position.

When the switch SW2 is further actuated in this state, the base block 3 is further driven to the rearmost position, and the emission unit 10 is rotated further counterclockwise by 30° as a result of meshing of the segmental gear 11d with the rack gear 4a, until a position or second bounce lighting position as shown in FIG. 6 is reached, in which the optical axis of the emission unit 10 makes an angle of 90° with that of the imaging lens 62. When the flashlight shooting is performed at these first and second bounce lighting positions, the light from the emission unit 10 is emitted to outside by way of the second shield window 1b so as to be reflected at a ceiling, for example, to achieve indirect flashlight illumination of the object.

When the switch SW2 is further actuated in this state, the driving direction of the motor 6 is reversed by the control circuit 50 so that the base block 3 is moved forwards. As a result, the segmental gear 11d is disengaged from the rack gear 4a so that the emission unit 10 is restored to its usual position shown in FIG. 4 under the bias of the tension coil 21. With the switch SW2 actuated continuously, the base block 3 is driven to its foremost position, the emission unit 10 assuming the near-distance shooting position shown in FIG. 5. In a similar manner, the emission unit 10 is reversed at the foremost or rearmost position, each time the switch SW2 is actuated, for repeating the above-described shifting operation.

Figure 9:
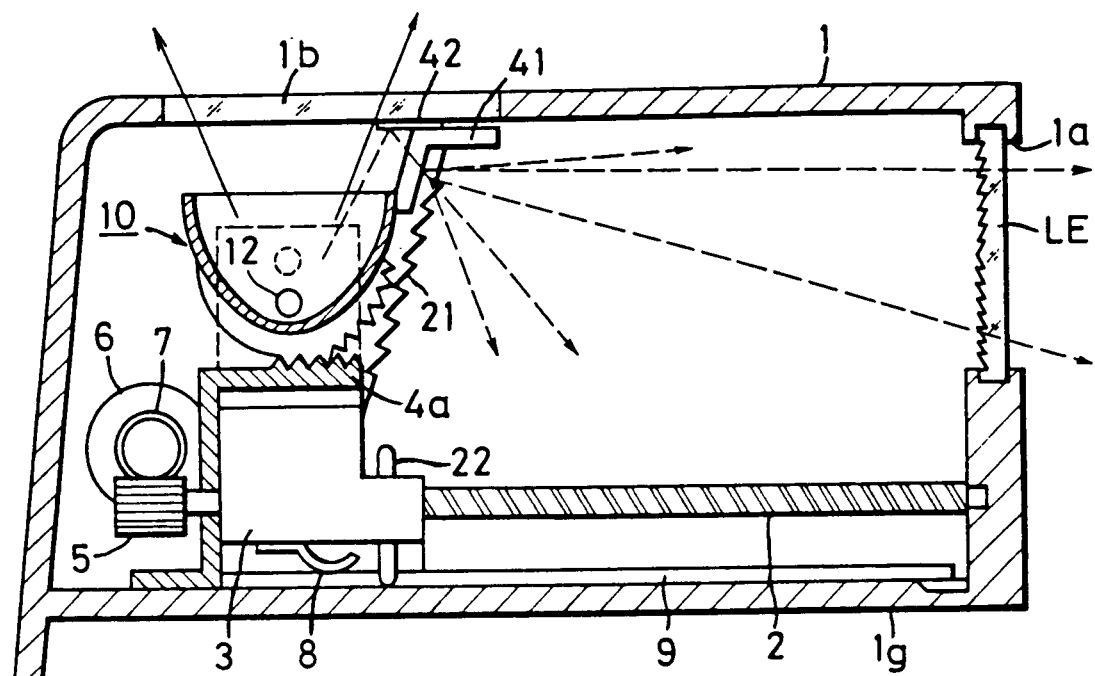
FIG. 9 is a sectional view showing a second embodiment of the light emission unit shifting device, with the light emission unit having been shifted to the rearmost position.
Figure 10:
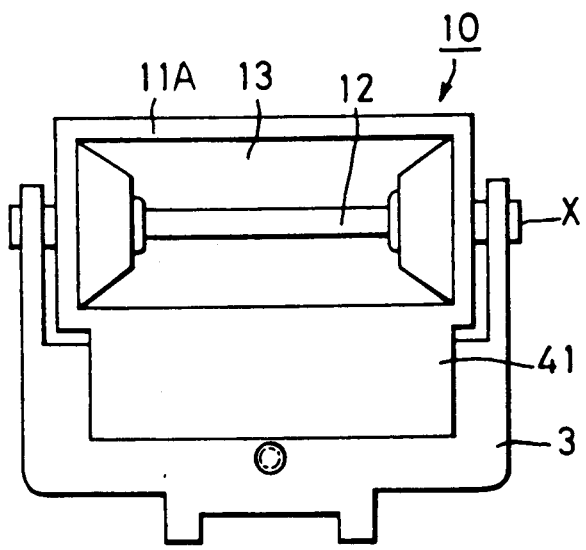
FIG. 10 is a front view showing the light emission unit of FIG. 9 in the normal position.

FIGS. 9 and 10 illustrate a modification of the present invention in which, during bounce lighting, the light is illuminated not only upwardly but also forwardly. Since the present modification is similar to the above-described first embodiment except a projecting arm 41 and a reflecting plate 42, the same numerals as those of FIGS. 1 to 4 are used to depict the components other than the projecting arm 41 and the reflecting plate 42, and the corresponding description is omitted for simplicity. Referring to FIG. 10, a frame 11A of a light emission unit 10 is formed with the projecting arm 41 having a broader width than the projecting arm 11a shown in FIG. 2. The projecting arm 41 is formed of transparent or opaque plastics having a satin finish surface. A reflecting plate 42 is mounted in a portion of the second shield window 1b. When the light is emitted from the emission tube 12, with the base block 3 at the rearmost position and with the emission unit 10 at the second bounce lighting position, the majority of the illuminating light is guided upwards by way of the second shield window 1b as described above so as to be reflected on, for example, a ceiling, for indirectly flashlighting the object. A minor portion of the illuminating light is reflected at the reflecting plate 42 so as to be radiated forwardly by way of the projecting arm 41 and the shield window 1a for directly flashlighting the object.

According to the embodiment shown in FIG. 9, the forwardly illuminating flashlight makes up for the shortage in the light volume. On the other hand, a bright light spot or catch light can be formed in the pupil of a person being imaged, so that the person can be imaged with a more vivid expression.

Although the bounce lighting positions of 60° and 90° are shown in the foregoing, the bounce lighting position can be changed to three or more positions, such as 70° and 80°, in addition to the above angles. If it is desired to narrow the field angle of illumination for bounce lighting, a convex lens may be provided in lieu of the plastic plate fitted to the second shield window 1b.

Although the electronic flashlight apparatus attached to a position above the camera side imaging lens 62 has been described in the first and second embodiments, it may also be attached to a position obliquely above the imaging lens 62. When the distance to an object is a near distance lesser than a predetermined value, it suffices to rotate the emission unit 10 obliquely downwards in the direction of the optical axis of the camera lens. In addition, the position of the emission unit 10 is determined in the above-described embodiments on the basis of the distance signal detected and transmitted from the camera side although the device for detecting the distance to the object may also be provided in the electronic flashlight apparatus per se.

Although the electronic flashlight apparatus capable of assuming the normal position, the bounce lighting position and the near-distance shooting position has been described above, it may also be adapted to assume any one of these positions. Although the electronic flashlight apparatus fitted to the outside of the camera body has been described in the foregoing, the present invention may also be applied to an electronic flashlight apparatus which is incorporated in the camera body.

If the distance to the object is less than a predetermined value, the position of the emission unit may be changed stepwise as a function of the distance to the object. In such case, the recess 1e of the housing 1 and the recess 11c of the projecting arm 11a may be formed with steps and the amount of descent of the slide pin 22 may be increased as the distance to the object is reduced to cause the angle of the emission unit 10 to approach the imaging lens.

According to the present invention, the emission unit is accommodated within the housing of the flashlight apparatus, so that the apparatus as a whole may be reduced in size, while water drops or the like may be prevented from intruding by way of interstices at the rotating part, resulting in improved operational reliability. In addition, since the position of the emission unit is adapted to be changed by motor driving, operability is also improved.

In the above embodiments, the emission unit is automatically set to the near-distance shooting position when the distance to the object is less than a predetermined value, so that operability is further improved advantageously.

What is claimed is:

1. An electronic flashlight apparatus attachable to a camera, comprising:
   a) flashlight projection means including a flashlight source and a reflecting optical system adapted for reflecting a portion of an illuminating light from said flashlight source;
   b) projecting direction converting means supporting said flashlight projection means and adapted for changing the projection position of said flashlight projection means between a normal projection position for projecting the illuminating light from said flashlight source towards an object and a special projection position for projecting the illuminating light in a predetermined direction different from the projection direction when in said normal projection position;
   c) driving means for driving said projection direction converting means;
   d) control means for electrically controlling said driving means; and
   e) a shield housing forming a closed inner space and accommodating at least said flashlight projection means and said projection direction converting means in said closed inner space.

2. The electronic flashlight apparatus according to claim 1, wherein said housing of the flashlight apparatus includes a forward shield window provided in the foremost part of a housing outer wall covering the flashlight projection means, and wherein said projection direction converting means is adapted to convert the direction of said flashlight projection means between said normal projection position in which said reflecting light system of said flashlight projection means faces directly toward said forward shield window to project the illuminating light from said flashlight source by way of said forward shield window and a near-distance projection position in which said reflecting light system faces obliquely relative to said forward shield window to project said illuminating light through said forward shield window so that the light emission axis of said flashlight projection means will pass through a position offset from the center of said forward shield window towards the imaging lens of the camera.

3. The electronic flashlight apparatus according to claim 2, further comprising decision means adapted for receiving a signal corresponding to the distance to an object for determining if said distance is less than a predetermined value, wherein said control means controls said driving means for setting said flashlight projection means to said normal projection position when said distance has been determined by said decision means to be not less than said predetermined value, and to said near-distance projection position when said distance to the object has been determined to be less than said predetermined value.

4. The electronic flashlight apparatus according to claim 2, further comprising:
 position detection means for detecting the position of said flashlight projection means relative to said forward shield window corresponding to a focal length of the imaging lens of said camera; and
 display means for displaying the position of said flashlight projection means detected by said position detection means.

5. The electronic flashlight apparatus according to claim 1 wherein said housing of the flashlight apparatus comprises a forward shield window provided at the forward part of an outer housing wall covering said flashlight projection means and an upper shield window provided at an upper surface of said outer housing wall, and wherein said projection direction converting means is adapted for converting the direction of said flashlight projection means between said normal projection position for projecting the illuminating light from said flashlight source through said forward shield window and a bounce lighting position of projecting said illuminating light through said upper shield window.

6. An electronic flashlight apparatus attachable to a camera, comprising:
 a) flashlight projection means including a flashlight source and a reflecting optical system reflecting a portion of an illuminating light from said flashlight source;
 b) a flashlight housing accommodating at least said flashlight projection means and including a forward shield window provided at a forward portion of an outer wall covering said flashlight projection means and an upper shield window provided on an upper surface of said outer wall;
 c) projection direction converting means supporting said flashlight projection means and adapted for changing the projection position of said flashlight projection means between a normal projection position in which said reflecting optical system of said flashlight projection means approximately opposes said forward shield window for projecting the illuminating light from said flashlight source through said forward shield window, a near-distance projection position in which said reflecting optical system faces obliquely relative to said forward shield window for projecting said illuminating light through said forward shield window so that the optical emission axis of said flashlight projection means will pass through a region below the center of said forward shield window towards the imaging lens, and a bounce lighting position in which said reflecting optical axis opposes said upper shield window for projecting the illuminating light from said flashlight source through said upper shield window;
 d) driving means for driving said projection direction converting means; and
 e) control means for electrically controlling said driving means.

7. The electronic flashlight apparatus according to claim 6 further comprising:
 position detection means for detecting the position of said flashlight projection means relative to said forward shield window corresponding a focal length of said imaging lens; and
 display means for displaying the position of said flashlight projection means detected by said position detection means.

8. The electronic flashlight apparatus according to claim 6, wherein said driving means is adapted to drive said projection direction converting means for shifting said flashlight projection means from a position in the vicinity of said forward shield window to a position in the vicinity of said upper shield window, said driving means being also adapted to change the projection position of said flashlight projection means from said near-distance projection position in which said reflecting optical system of said flashlight projection means faces obliquely relative to said forward shield window in the vicinity of said forward shield window to said normal projection position in which said reflecting optical system substantially opposes to said forward shield window, said driving means being also adapted to drive said projection direction converting means for changing the direction of said flashlight projection means in the vicinity of said upper shield window from said normal projection position to said bounce lighting position in which said reflecting optical system opposes to said upper shield window.

9. The electronic flashlight apparatus according to claim 8, wherein said projection direction converting means comprises a base block supporting said flashlight projection means for movement in an elevating direction, a spring member biasing said flashlight projection means so that said flashlight projection means assumes said near-distance projection position, a rack gear secured to said housing, a segmental gear meshing with said rack gear when said flashlight projection means is moved along with said base block to a predetermined position in the vicinity of said upper shield window for converting the direction of said reflecting optical system to said bounce lighting position against the bias of said spring member, and a slide pin slidably supported by said base block and holding said flashlight projection means in said normal projection position against the bias of said spring member, and wherein said driving means comprises a feed screw unit for shifting said base block and a driving electric motor for driving said base block by means of said feed screw unit.

10. The electronic flashlight apparatus according to claim 6, further comprising decision means for receiving a signal corresponding to a distance to an object and determining if the distance to the object is less than a predetermined value, wherein said control means controls said driving means to cause said flashlight projection means to assume said normal projection position when said distance to the object has been determined by said decision means to be not less than predetermined value, said and assume projection position when said distance to the object has been determined to be less than said predetermined value.

* * * * *